United States Patent [19]

Inoue

[11] Patent Number: 4,511,160
[45] Date of Patent: Apr. 16, 1985

[54] VEHICLE REAR WHEEL SUSPENSION

[75] Inventor: Hitoshi Inoue, Hiroshima, Japan

[73] Assignee: Mazda Motor Corporation, Hiroshima, Japan

[21] Appl. No.: 498,541

[22] Filed: May 26, 1983

[30] Foreign Application Priority Data

May 31, 1982 [JP] Japan ................................. 57-93368

[51] Int. Cl.³ .............................................. B60G 3/00
[52] U.S. Cl. ................................... 280/701; 280/690; 280/696
[58] Field of Search ............... 280/696, 690, 688, 689, 280/701, 666, 724, 668, 725, 670, 726; 180/73 TL, 73 TT, 73.4, 73.5

[56] References Cited

U.S. PATENT DOCUMENTS

| | | | |
|---|---|---|---|
| 3,830,516 | 8/1974 | Hickman | 280/690 |
| 3,892,284 | 7/1975 | Braess et al. | 280/690 |
| 4,157,840 | 6/1979 | Kroniger et al. | 280/688 |
| 4,245,853 | 1/1981 | Inoue et al. | 280/701 |
| 4,269,432 | 5/1981 | Inoue et al. | 180/73.4 |

*Primary Examiner*—Richard A. Bertsch
*Attorney, Agent, or Firm*—Fleit, Jacobson, Cohn & Price

[57] ABSTRACT

A vehicle suspension mechanism including a wheel hub carrying a vehicle rear wheel for rotation about its axis of rotation, a pair of lateral links extending substantially transversely and having inward ends connected with the vehicle body for vertical and fore-and-aft swinging movements. The lateral links have outward ends swingably connected with the wheel hub, with the longitudinal distance between the inward ends of the lateral links being larger than the longitudinal distance between the outward ends whereby a toe-in displacement is produced in the rear wheel when the wheel hub means is rearwardly displaced. The suspension mechanism further includes a longitudinal link having one end swingably connected with the vehicle body and the other end swingably connected with the wheel hub and a suspension strut assembly secured to the wheel hub and swingably connected with the vehicle body. The longitudinal link is inclined rearwardly and downwardly with respect to a line passing through the inward ends of the lateral links and a toe-in displacement is produced in the rear wheel when the rear wheel is upwardly bumped.

4 Claims, 9 Drawing Figures

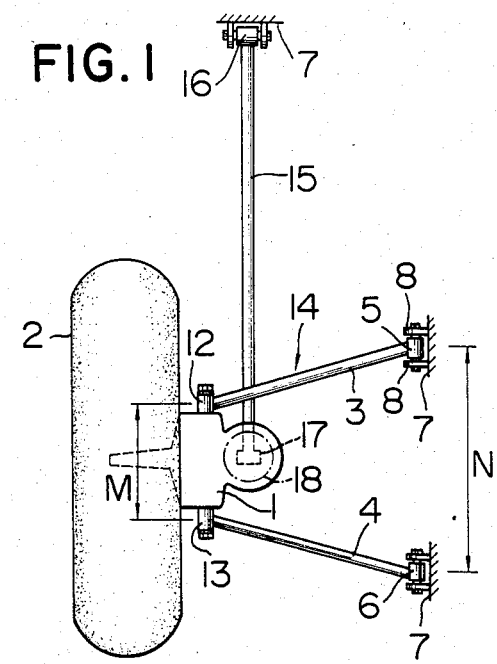
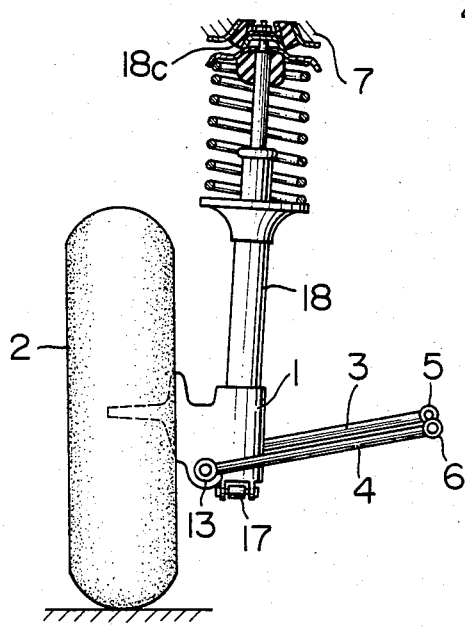
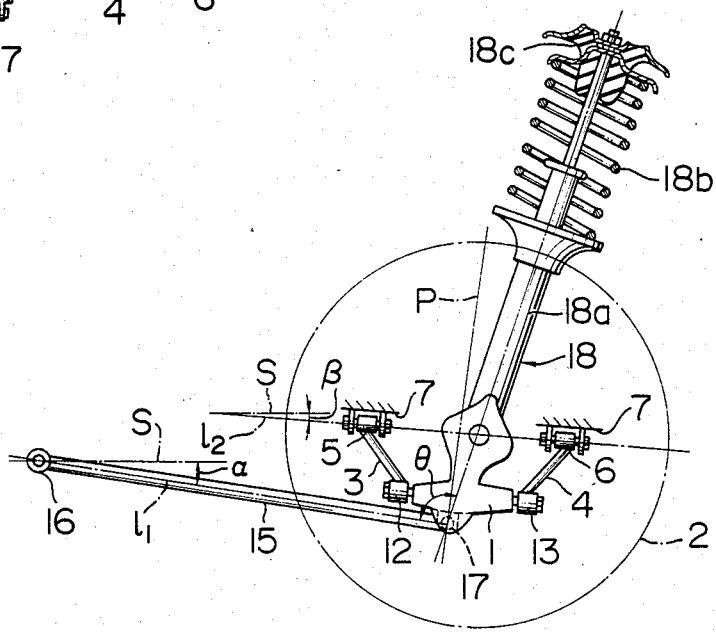

VEHICLE REAR WHEEL SUSPENSION

The present invention relates to suspension mechanisms for motor vehicles and more particularly to rear suspension mechanisms therefor.

In general, in order to provide motor vehicles with steering stability in rough roads or in curved paths, it is preferable to produce toe-in displacements in rear wheels. To comply with such demands, the U.S. Pat. No. 4,269,432 issued to H. INOUE et al. on May 26, 1981 proposes a vehicle rear suspension mechanism which includes a pair of substantially transversely extending link arms having transverse inner ends connected with a vehicle body for vertical swinging movements and for fore and aft swinging movements in limited extents. The transverse outer ends of the link arms are swingably connected with a wheel carrier which carries a rear wheel for rotation about its axis. The longitudinal spacing between the transverse inner ends of the link arms is larger than that between the transverse outer ends so that the link arms define a trapezoidal configuration in a plan view. With the arrangement as proposed by the U.S. patent, a toe-in displacement is produced in the rear wheel when a rearwardly directed force is applied from the ground to the wheel. This means that such a toe-in displacement will be produced whenever a braking force is applied.

It is an object of the present invention to provide a vehicle rear suspension mechanism in which a rear wheel toe-in displacement can be produced in a more positive manner.

Another object of the present invention is to arrange a rear suspension strut assembly so that it contributes to produce a toe-in displacement in the rear wheel when the rear wheel is upwardly bumped.

A further object of the present invention is to provide a strut type rear suspension mechanism in which the suspension strut assembly is arranged with a rearward inclination so that the suspension linkage is twisted under an upward bump of the rear wheel to produce a toe-in displacement of the rear wheel.

According to the present invention, the above and other objects can be accomplished by a vehicle rear suspension mechanism comprising wheel hub means carrying a vehicle rear wheel for rotation about its axis of rotation, a pair of lateral links extending substantially transversely and having transverse inward ends connected with a longitudinal distance therebetween to vehicle body means for vertical and fore-and-aft swinging movements, said lateral links having transverse outward ends swingably connected with a longitudinal distance therebetween to said wheel hub means, said longitudinal distance between the transverse inward ends of the lateral links being larger than the longitudinal distance between the transverse outward ends whereby a toe-in displacement is produced in the rear wheel when the wheel hub means is rearwardly displaced, a longitudinal link having one end swingably connected with the vehicle body means and the other end swingably connected with the wheel hub means, said longitudinal link being inclined rearwardly and downwardly with respect to a line passing through said transverse inward ends of said lateral links, a suspension strut assembly having a lower end secured to said wheel hub means and an upper end swingably connected with the vehicle body means, said suspension strut assembly being inclined rearwardly with respect to a plane perpendicular to the longitudinal link whereby a toe-in displacement is produced in the rear wheel when the rear wheel is upwardly bumped. According to the features of the present invention, when the rear wheel is upwardly bumped, the wheel hub is rearwardly displaced and twisted due to the rearward inclination of the strut assembly producing a twisting deformation in the linkage comprised of the pair of lateral links. Due to this twisting deformation of the linkage, the wheel hub is also displaced in the toe-in direction so that a toe-in displacement can be produced without fail.

The above and other objects and features of the present invention will become apparent from the following descriptions of preferred embodiments taking reference to the accompanying drawings, in which:

FIG. 1 is a top plan view of a rear suspension mechanism in accordance with one embodiment of the present invention;

FIG. 2 is a partially cut-away rear view of the rear suspension mechanism shown in FIG. 1;

FIG. 3 is a side view of the rear suspension mechanism shown in FIGS. 1 and 2;

Figure 4:
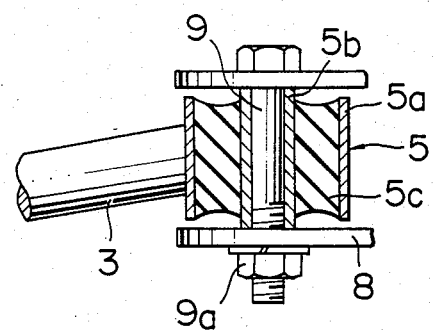
FIG. 4 is a sectional view showing the connection between the front lateral link and the vehicle body.

Referring to the drawings, particularly to FIGS. 1 through 3, there is shown a vehicle rear suspension mechanism including a wheel hub 1 which carries a rear wheel 2 for rotation about its rotating axis. The suspension mechanism further includes a front lateral link 3 and a rear lateral link 4 which extend substantially transversely. The front lateral link 3 is provided at its transverse inward end with a rubber bush assembly 5 which comprises, as shown in FIG. 4, an outer tube 5a, an inner tube 5b and a cylindrical resilient rubber 5c between the outer and inner tubes. The outer tube 5a is welded to the inward end of the front lateral link 3. The inner tube 5b has an axial length larger than that of the outer tube 5a and is disposed between a pair of bracket flanges 8 provided on a vehicle body member 7. A bolt 9 is inserted through the bracket flanges 8 and the inner tube 5b of the rubber bush assembly 5, and engaged with a nut 9a. Thus, the front lateral link 3 is connected with the vehicle body for swinging movement about a substantially longitudinal, horizontal axis. Further, the link 3 is swingable in the fore-and-aft direction within the range of resiliency of the rubber 5c. The rear lateral link 4 is similarly provided at its inward end with a rubber bush assembly 6 and connected with the vehicle body member 7 for swinging movements.

Figure 5:
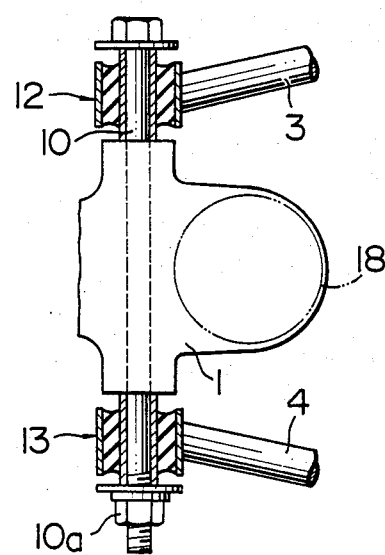
FIG. 5 is a sectional view showing the connection between the front and rear lateral links and the rear wheel hub.

As shown in FIG. 5, the lateral links 3 and 4 are respectively provided with rubber bush assemblies 12 and 13 which are similar in construction to the bush assembly 5. The bush assemblies 12 and 13 are longitudinally spaced from each other with the wheel hub 1 held therebetween. A through-bolt 10 is inserted in a substantially longitudinal direction through the rubber bush assemblies 12 and 13 and the wheel hub 1 and engaged with a nut 10a. Thus, the lateral links 3 and 4 are swingably connected to the wheel hub 1.

Referring to FIGS. 1 and 3, it will be noted that there is further provided a longitudinally extending link 15 which has a forward end provided with a rubber bush assembly 16 similar to the rubber bush assembly 5. The forward end of the longitudinal link 15 is connected with the vehicle body 7 through the rubber bush assembly 16 for vertical and sideward swinging movements. The link 15 is further provided at the rear end with a rubber bush 17 similar to the rubber bush assembly 5 and swingably connected with the wheel hub 1 through this rubber bush assembly 17. In the illustrated embodiment, the rubber bushes 5 and 6 are aligned so that a line $l_2$ passing through their axes is inclined by an angle $\beta$ with respect to a horizontal plane S as shown in FIG. 3. Further, the longitudinal link 15 has an axis $l_1$ which is inclined by an angle $\alpha$ with respect to the horizontal plane S. It should also be noted that the angle $\alpha$ is larger than the angle $\beta$ in this embodiment.

The suspension mechanism further includes a suspension strut assembly 18 which may be of a conventional type including an oleo strut 18a and a spring 18b. The strut assembly 18 is secured at the lower end to the wheel hub 1 so that the strut assembly 18 moves with the wheel hub 1 as a unit. The upper end of the strut assembly 18 is swingably connected with the vehicle body 7 through a resilient connector 18c. Geometrically, the longitudinal distance N between the rubber bush assemblies 5 and 6 on the lateral links 3 and 4 is greater than the longitudinal distance M between the rubber bush assemblies 12 and 13 so that the links 3 and 4 define a trapezoidal configuration. As shown in FIG. 3, the strut assembly 18 is rearwardly inclined with respect to a plane P which is perpendicular to the axis $l_1$ of the link 15. In other words, the angle $\theta$ between the link 15 and the strut assembly 18 is greater than the right angle.

Figure 6:
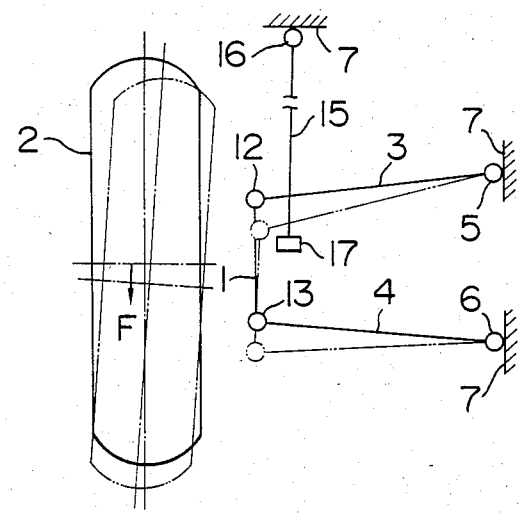
FIG. 6 is a diagrammatical top plan view of the suspension link mechanism showing the behavior under a braking force.

Referring now to FIG. 6, when a braking force F is applied from the ground to the rear wheel 2, slight deformations are produced in the rubber bush assemblies 16 and 17 to allow the links 3 and 4 to displace as shown by phantom lines. Due to the geometrical arrangement of the links 3 and 4, the rubber bush assembly 12 on the outward end of the link 3 is transversely inwardly shifted with respect to the rubber bush assembly 13 on the outward end of the link 4 through the displacements of the links 3 and 4. Thus, the wheel hub 1 is displaced in the toe-in direction and therefore a toe-in displacement is produced in the rear wheel 2 as shown by phantom lines.

Figure 7:
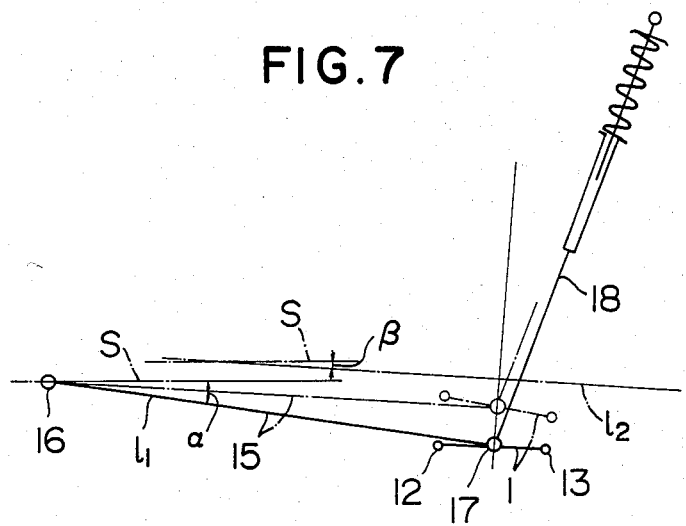
FIG. 7 is a diagrammatical side view of the suspension link mechanism showing the behavior under an upward bump of the rear wheel.
Figure 8:
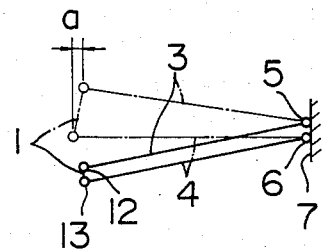
FIG. 8 is a diagrammatical rear view of the suspension link mechanism showing the behavior under an upward bump of the rear wheel; and, FIG. 9 is a diagrammatical side view showing another embodiment of the present invention.

Referring to FIGS. 7 and 8, it will be noted that, when the rear wheel 2 is upwardly bumped, the wheel hub 1 is upwardly shifted producing an upward swinging movement of the link 15 about the axis of the front rubber bush assembly 16. As the wheel hub 1 is upwardly shifted, the strut assembly 18 is correspondingly contracted and a slight swinging movement of the strut assembly 18 is produced about the upper end thereof. This causes an upward twisting movement of the wheel hub 1 as shown in FIG. 7. Thus, the transverse outward end of the link 3 is moved upwardly by a greater distance than the corresponding end of the link 4 does as shown in FIG. 8 producing an inward displacement $a$ of the outward end of the link 3 with respect to the outward end of the link 4. It will therefore be understood that toe-in movements are produced in the wheel hub 1 and also in the rear wheel 2. In the illustrated embodiment wherein the longitudinal link 15 is downwardly inclined with respect to the line passing through the axes of the bush assemblies 5 and 6, the tendency of producing to toe-in displacement can further be enhanced. Described in more detail, when the rear wheel 2 is upwardly bumped, the wheel hub 1 will be shifted rearwardly by the longitudinal link 15 producing similar displacements in the links 3 and 4 as shown in FIG. 6. Therefore, a toe-in displacement is produced in the rear wheel 2 as described with reference to FIG. 6.

Figure 9:
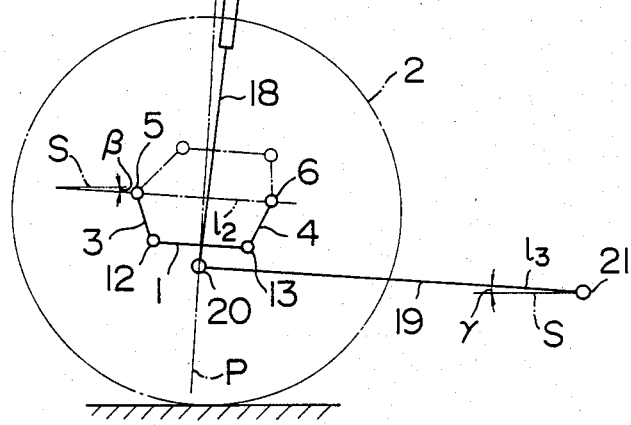

FIG. 9 shows another embodiment of the present invention in which corresponding parts are designated by the same reference numerals. In this embodiment, a longitudinal link 19 extends rearwardly from the wheel hub 1. The link has a front end connected through a rubber bush assembly 20 with the wheel hub 1 and a rear end connected through a rubber bush assembly 21 with the vehicle body. The link 19 is inclined with respect to a horizontal plane S by an angle $\gamma$ which is greater than the angle $\beta$ of the inclination of the line $l_2$ passing through the rubber bush assemblies 5 and 6. The strut assembly 18 is rearwardly inclined with respect to a plane P perpendicular to the link 19. In other respects, the arrangements are the same as in the previous embodiment and it is possible to produce toe-in displacements in the rear wheel under a brake force and an upward bump of the rear wheel.

The invention has thus been shown and described with reference to specific embodiments, however, it should be noted that the invention is in no way limited to the details of the illustrated structures but changes and modifications may be made without departing from the appended claims.

I claim:

1. A vehicle rear suspension mechanism comprising wheel hub means carrying a vehicle rear wheel for rotation about its axis of rotation, a pair of lateral links extending substantially transversely and having transverse inward ends connected with a longitudinal distance therebetween to vehicle body means for vertical and fore-and-aft swinging movements, said lateral links having transverse outward ends swingably connected with a longitudinal distance therebetween to said wheel hub means, said longitudinal distance between the transverse inward ends of the lateral links being larger than the longitudinal distance between the transverse outward ends, a longitudinal link having one end connected with the vechicle body means and the other end connected with an assembly of the wheel hub means and said lateral links, to transmit a longitudinal force, the improvement comprising a suspension strut assembly which is comprised of damper means and a spring means, said strut assembly having a lower end secured to said wheel hub means and an upper end swingably connected with the vehicle body means, said strut assembly being inclined rearwardly with respect to a line perpendicular to said longitudinal link.

2. A vehicle rear suspension mechanism in accordance with claim 1 in which said longitudinal link has an axis which passes through said one end and said other end and is inclined rearwardly and downwardly with respect to a line passing through the transverse inward ends of the lateral links.

3. A vehicle rear suspension mechanism in accordance with claim 1 in which said longitudinal link is a trailing link having a forward end swingably connected with the vehicle body means and a rear end pivotably connected with the wheel hub means, said trailing link being inclined rearwardly and downwardly and making said strut assembly an angle greater than 90°.

4. A vehicle rear suspension mechanism in accordance with claim 1 in which said longitudinal link is a leading link having a forward end pivotably connected with the wheel hub means and a rear end swingably connected with the vehicle body means.

* * * * *